(12) United States Patent
Varma

(10) Patent No.: US 8,943,449 B1
(45) Date of Patent: Jan. 27, 2015

(54) METHOD AND APPARATUS OF ENABLING DIRECT MEMORY ACCESS INTO A TARGET SYSTEM MEMORY MODELED IN DUAL ABSTRACTIONS WHILE ENSURING COHERENCY

(71) Applicant: Cadence Design Systems, Inc., San Jose, CA (US)

(72) Inventor: Ashutosh Varma, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/942,646

(22) Filed: Jul. 15, 2013

(51) Int. Cl.
*G06F 17/50* (2006.01)
*G06F 12/14* (2006.01)

(52) U.S. Cl.
CPC ............ *G06F 17/5027* (2013.01); *G06F 12/14* (2013.01)
USPC .......................................... 716/106; 716/108

(58) Field of Classification Search
CPC .............. B41J 2/04541; B41J 2/04551; B41J 2/04586; B41J 2/155; B41J 2/04591; B41J 2/2139; G06F 12/0292; G06F 12/1036; G06F 12/1408; G06F 2009/45583; G06F 21/57; G06F 21/72; G06F 21/73; G06F 21/75; G06F 21/554; G06F 21/575; G06F 21/64; G06F 21/71; G06F 21/74; G06F 21/78; G06F 15/17343; G06F 15/17381
USPC ................................................... 716/100–106
See application file for complete search history.

(56) References Cited

U.S. PATENT DOCUMENTS

| 7,222,221 B1* | 5/2007 | Agesen et al. ................ 711/141 |
| 7,783,838 B1* | 8/2010 | Agesen et al. ................ 711/141 |
| 2011/0173371 A1* | 7/2011 | Karamcheti et al. ............. 711/6 |

* cited by examiner

*Primary Examiner* — Binh Tat
(74) *Attorney, Agent, or Firm* — Dickstein Shapiro LLP

(57) ABSTRACT

The present patent document relates to a method and apparatus for enabling direct memory access into a target memory subsystem of an electronic system modeled in dual abstractions while maintaining coherency. The portions of the memory subsystem shared between the first abstraction and the second abstraction are shadowed in both abstractions, allowing either abstraction to coherently access memory written by the other. Flags associated with memory pages of the memory subsystem are set to indicate which abstraction has most recently updated the memory page. Where the first abstraction is SystemC using TLM2, DMI access may be selectively enabled to facilitate faster access from SystemC, and DMI access disabled when an access from the second abstraction is detected in order to invoke coherency procedures. This allows coherency to be maintained and may enable faster software code execution where most access are DMI accesses from SystemC.

19 Claims, 4 Drawing Sheets

METHOD AND APPARATUS OF ENABLING DIRECT MEMORY ACCESS INTO A TARGET SYSTEM MEMORY MODELED IN DUAL ABSTRACTIONS WHILE ENSURING COHERENCY

FIELD

The present patent document relates generally to verifying the functionality of integrated circuit designs prior to fabrication. In particular, the present patent document relates to a method and apparatus for maintaining coherency in the memory subsystem of an electronic system modeled in dual abstractions. Such dual abstractions can include C/SystemC simulation and register transfer level (RTL)/gate level hardware emulation.

BACKGROUND

Increasing numbers of integrated circuits ("chips") feature system on chip ("SoC") designs, where a number of different components are integrated onto a single chip. These components can include digital, analog, and mixed signal devices. SoC devices can be designed in various abstractions, including C/SystemC transaction accurate, C/SystemC cycle accurate, RTL, and gate abstractions. Often one part of the SoC is modeled in one level of abstraction, while another part is modeled in a different abstraction. This may be done for reasons of efficiency of model creation, accuracy, or performance. As an example, a CPU of the SoC may be best modeled at a SystemC transaction level for faster software code execution, while a sub-block of the SoC is modeled at an RTL level for cycle-accuracy. A SoC model created with more than one abstraction can be termed a "hybrid model."

SoC devices are typically functionally verified prior to fabrication using hardware, software, or a combination of hardware and software specially designed to perform functional verification. Such functional verification devices can include simulators and emulators, both of which can be used to perform co-simulation of hybrid models. An immediate problem that arises out of this hybrid model is representation of shared system resources, such as memory. As an example, for fast CPU execution at the transaction level in SystemC simulation, the memory is typically best modeled in SystemC. However, for fast RTL emulation, the memory is typically best modeled as RTL.

The usage of system level memory in a SoC falls into three broad categories: (i) memory used exclusively by the operating system and user applications for running code and computations (software), (ii) memory used exclusively by SoC's input/output (I/O) blocks for their own storage, and (iii) memory shared between software and I/O blocks. The traditional approach to such shared memory space is to either keep memory as an entirely SystemC model (a "memory-out" approach from the point of view of RTL running in an emulator) or keep memory as entirely RTL ("memory-in" from the point of view of the emulator). In either case, there is significant overhead. In the memory-out case this is because of the RTL frequently accessing a SystemC memory through a RTL-to-SystemC transactor. In the memory-in case this is because of a CPU accessing the RTL memory through a SystemC-to-RTL transactor. This overhead results as the emulator needs to stop and synchronize to SystemC simulation to allow for each of these accesses. These frequent accesses are very inefficient for overall simulation performance of the model. As a result, the system simulation performance will be lower compared to either the all-virtual SystemC SoC model or the all-RTL SoC running in an emulator.

Memory models can also be created that provide native access in both a C/SystemC and RTL abstractions. In this model, two images for each memory are created, one in each abstraction. However, a problem with this topology is maintaining coherency between the two images of the same memory, for each of the memories.

SUMMARY

A method and apparatus for maintaining coherency in the memory subsystem of an electronic system modeled in dual abstractions is disclosed.

An embodiment comprises a method of accessing memory in a memory subsystem of a functional verification system, wherein the memory subsystem comprises a memory page modeled in a first design abstraction, and a shadow memory page for the memory page, wherein the shadow memory is modeled in a second design abstraction, the method comprising enabling a first method for an agent in the first design abstraction to access the memory page; receiving an access request from an agent in the second design abstraction to access the shadow memory page; disabling the first method upon receipt of the access request; and enabling a second method for the agent in the first design abstraction to access the memory page upon receipt of the request.

An embodiment comprises a computer-readable non-transitory storage medium having stored thereon a plurality of instructions. The plurality of instructions when executed by a computer, cause the computer to perform enabling a first method for an agent to access a memory page modeled in a first design abstraction of a memory subsystem in a functional verification system; receiving an access request from an agent in the second design abstraction to access a shadow memory page modeled in a second design abstraction of the memory subsystem; disabling the first method upon receipt of the access request; and enabling a second method for the agent in the first design abstraction to access the memory page upon receipt of the request.

In another embodiment the access request is a write request, and the embodiment further comprises writing to the shadow memory page; and setting a flag associated with the memory page to indicate that the shadow memory page has been updated more recently than the memory page.

Another embodiment comprises clearing the flag associated with the memory page; disabling the second method after the flag is cleared; and enabling the first method after the flag is cleared.

In another embodiment the first design abstraction is a SystemC modeling abstraction.

In another embodiment the second method is a Direct Memory Interface (DMI) method.

Another embodiment comprises enabling a second method comprises enabling DMI read and DMI write.

In another embodiment the second design abstraction is a RTL modeling abstraction.

In another embodiment the memory page is one of a plurality of memory pages, wherein each memory page of the plurality of memory pages comprises a memory page modeled in the first design abstraction and a shadow memory page for the memory page modeled in the second design abstraction, and wherein each memory page of the plurality of memory pages is accessible to the agent in the first design abstraction using the first method and the second method.

In another embodiment, a functional verification system comprises a host workstation that includes a workstation memory to store a memory page modeled in a first design abstraction, and a processor to run a processor model in the first design abstraction, the processor model configured to run a first agent that can invoke a first method to access the modeled memory page until the first agent detects that a second agent, configured to run in a second design abstraction in an emulation hardware device, has requested access to a shadow copy of the memory page, whereupon the first method is disabled and the first agent can invoke a second method to access the modeled memory page; and a communication link adapted to connect the emulation hardware device to the host workstation, wherein the communication link can transport a message to indicate that the second agent has requested access to the shadow copy.

In another embodiment the host workstation further comprises a first flag register having a state, and associated with the memory page, to indicate whether the memory page is more recently updated than the shadow copy of the memory page.

In another embodiment the first design abstraction is a SystemC modeling abstraction.

In another embodiment the first method is a Direct Memory Interface (DMI) method.

In another embodiment the access request from the second agent comprises a write access request.

In another embodiment the memory page is one of a plurality of memory pages, and the first method and the second method are configured to provide access to the plurality of memory pages for the first agent.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
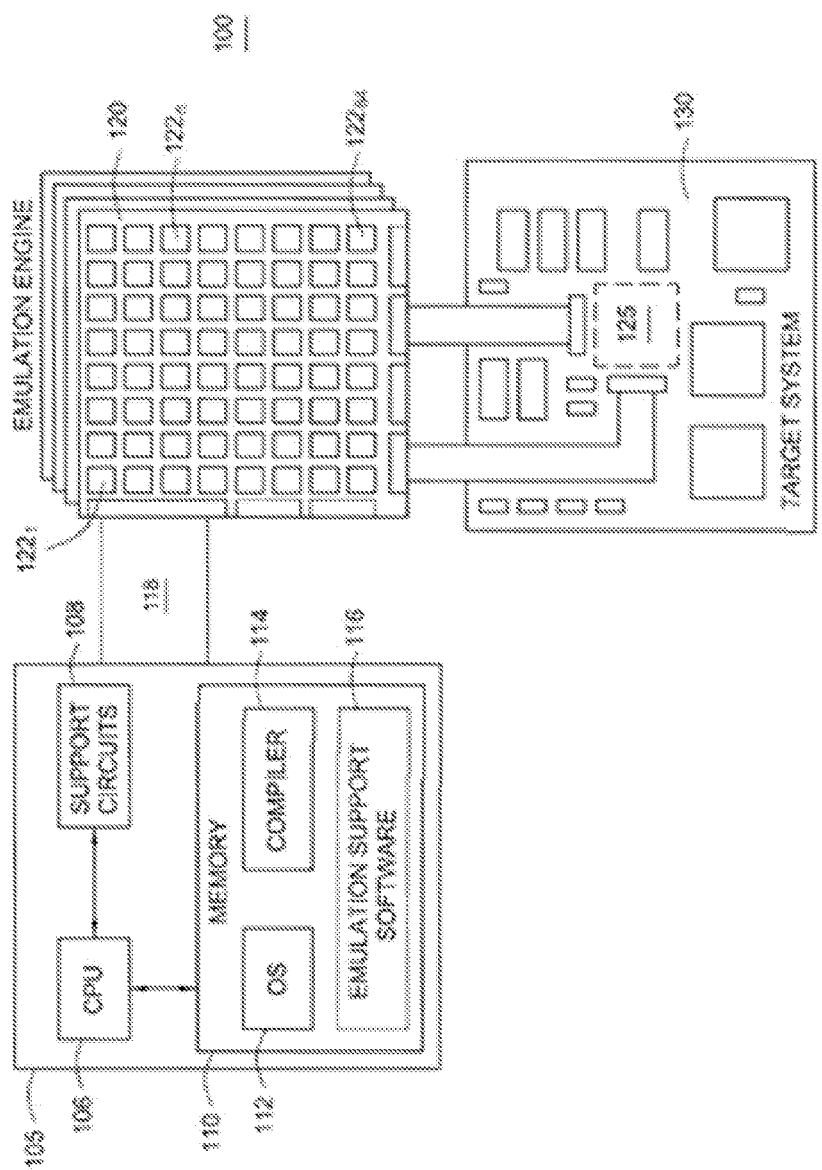
FIG. 1 is an illustration of a processor-based hardware emulation system.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for maintaining coherency in the memory subsystem of an electronic system modeled in dual design abstractions is disclosed. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Typical functional verification systems, including hardware emulation systems and simulation acceleration systems, utilize interconnected programmable logic chips or interconnected processor chips. Examples of systems using programmable logic devices are disclosed in, for example, U.S. Pat. No. 5,109,353 entitled "Apparatus for emulation of electronic hardware system," No. 5,036,473 entitled "Method of using electronically reconfigurable logic circuits," No. 5,475,830 entitled "Structure and method for providing a reconfigurable emulation circuit without hold time violations," and No. 5,960,191 entitled "Emulation system with time-multiplexed interconnect." U.S. Pat. Nos. 5,109,353, 5,036,473, 5,475,830, and 5,960,191 are incorporated herein by reference. Examples of hardware logic emulation systems using processor chips are disclosed in, for example, U.S. Pat. No. 6,618,698 "Clustered processors in an emulation engine," No. 5,551,013 entitled "Multiprocessor for hardware emulation," No. 6,035,117 entitled "Tightly coupled emulation processors," and No. 6,051,030 entitled "Emulation module having planar array organization." U.S. Pat. Nos. 6,618,698, 5,551,013, 6,035,117, and 6,051,030 are incorporated herein by reference.

A method and apparatus for maintaining coherency of memory modeled in dual abstractions of SystemC and RTL is described in U.S. patent application Ser. No. 13/793,388 entitled "A Method and Apparatus for Maintaining Coherency in the Memory Subsystem of an Electronic System Modeled in Dual Abstractions," which is hereby incorporate by reference in its entirety.

FIG. 1 illustrate an overview of a processor-based emulation system 100. The system comprises a host or computer workstation 105, an emulation engine including emulation board 120, and a target system 130.

The host workstation 105 provides emulation support facilities to the emulation engine 100 and emulation board 120. The host workstation 105, for example a personal computer, comprises at least one central processing unit (CPU) 106, support circuits 108, and a memory 110. The CPU 106 may comprise one or more conventionally available microprocessors and/or microcontrollers. The support circuits 108 are well known circuits that are used to support the operation of the CPU 106. These supporting circuits comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 stores various forms of software and files for the emulation system, such as an operating system (OS) 112, a compiler 114, and emulation support software 116.

The compiler 114 converts a hardware design, such as hardware described in VHDL or Verilog, to a sequence of instructions that can be evaluated by the emulation board 120.

The host workstation 105 allows a user to interface with the emulation engine 100 via communications channel 118, including emulation board 120, and control the emulation process and collect emulation results for analysis. Under control of the host workstation 105, programming information and data is loaded to the emulation engine 100. The emulation board 120 has on it a number of individual emulation chips, for example the 64 emulation chips $122_1$ to $122_{64}$ (collectively 122) shown in FIG. 1, in addition to miscellaneous support circuitry.

In response to programming received from the emulation support software 116, emulation engine 100 emulates a portion 125 of the target system 130. Portion 125 of the target system 130 may be an integrated circuit, a memory, a processor, or any other object or device that may be emulated in a programming language. Exemplary emulation programming languages include Verilog and VHDL.

Figure 2:
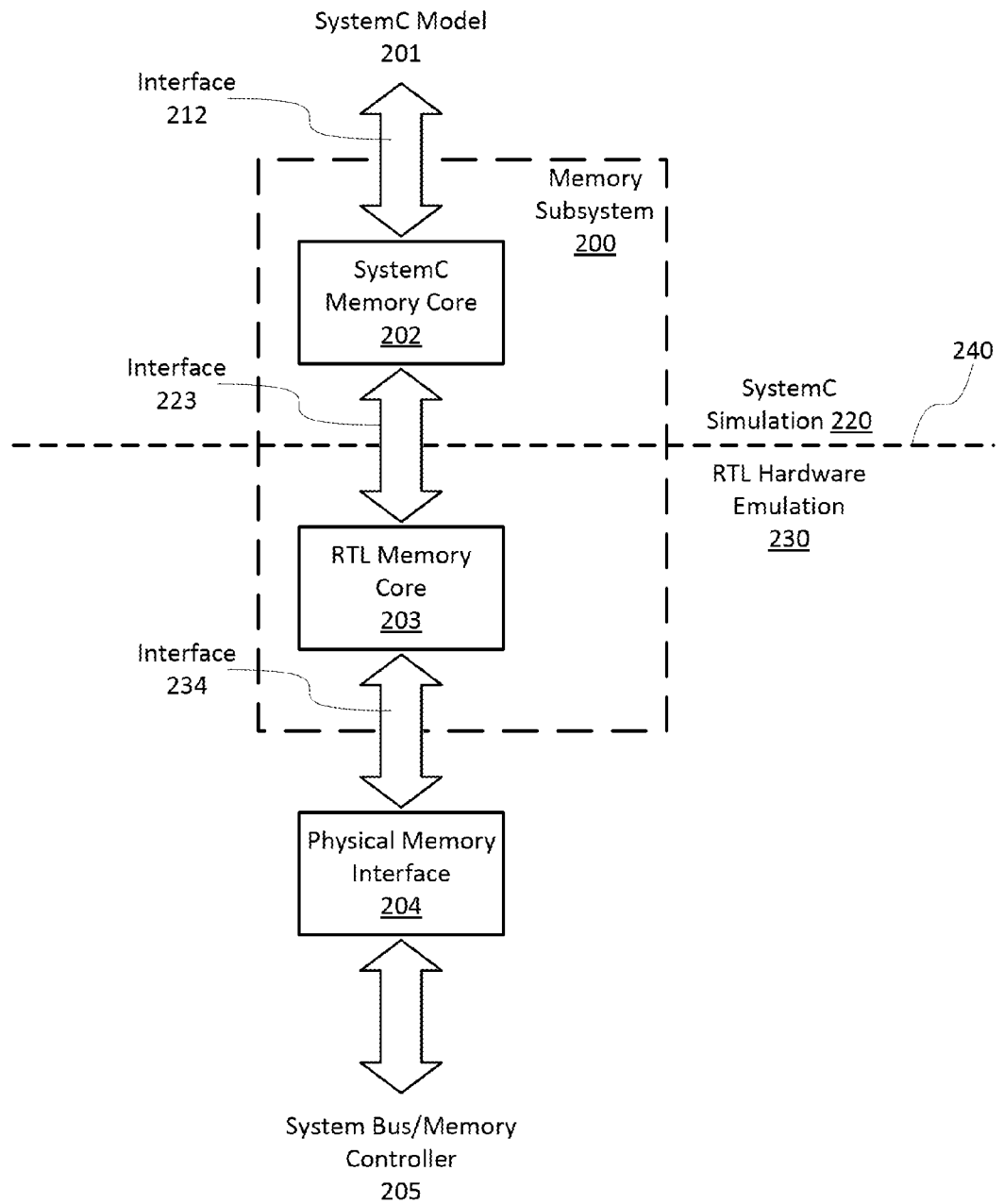
FIG. 2 is an illustration a memory subsystem that allows execution in either SystemC simulation or RTL emulation.

FIG. 2 illustrates, according to an embodiment, a system for maintaining coherency in the memory subsystem 200 of a SoC modeled in two abstractions, a first for C/SystemC simulation and a second for RTL or gate-level emulation. The memory subsystem 200 is part of the overall system memory. Depending on the design of the SOC, memory subsystem 200 can comprise the entirety of the system memory. Divide 240 separates the two memory abstractions' images into a C/SystemC simulation side 220 and a RTL hardware emulation side 230. On the C/SystemC simulation side 220, the C/SystemC memory core 202 has an interface 212 with SystemC Model 201. Interface 212 can be for example a transaction-level model interface, such as SystemC TLM2, or a direct memory interface (DMI), or both. On the RTL hardware emulation side 230, the RTL memory core 203 has a generic interface 234 with physical memory interface 204, which is in communication with the system bus/memory controller 205.

The SystemC memory core 202 and RTL memory core 203 are images of the same memory; shared memory block 200 has both a SystemC model of memory as well as a shadow RTL memory. In other embodiments, the memory block can have a RTL model of memory as well as a shadow SystemC memory. Shared memory block 200 is used for a hybrid virtual SystemC-plus-RTL model, where a particular section of system memory map is used exclusively for communication back and forth between CPU in the SystemC virtual environment and an RTL block. Shared memory block 200 minimizes this need for cross-abstraction access by maintaining memory in one abstraction and the shadow memory in the other abstraction and implementing a method of coherency from either perspective through software modeling and emulation (direct memory access to RTL memory blocks in emulator) techniques. Shared memory block 200, and consequently SystemC memory core 202 and RTL memory core 203, is divided into pages. The sizes of the pages can be determined based on the application using the memory space.

This minimizes the need for synchronization while maximizing the usage of memory transfer bandwidth.

The memory subsystem space is part of the overall system memory, and can be accessed using TLM2 transactions, and can be accessed using DMI. Where the memory space is a subset of the overall system memory space, the memory subsystem is able to be allocated into a particular portion of the CPU memory space. Allocation involves both size and address allocation, through a flexible memory map configuration. The memory subsystem 200 provides a RTL shadow memory model for a desired CPU and interconnect bus architecture in RTL. Such bus architectures include an Advanced eXtensible Interface™ (AXI™), AXI Coherency Extensions™ (ACE™), or a double data-rate type three (DDR3) interface. Whichever of these bus architectures is used, RTL memory core 203 is bus architecture independent and can support any particular RTL access protocol. The implementation of memory subsystem 200 does not require changes to the operating system, drivers, or the application of the user of the system.

According to another embodiment, the subsystem memory space comprises the full system memory.

According to an embodiment, the memory subsystem can be operated in a time-synchronized co-simulation/emulation execution mode, where the SystemC and RTL abstractions maintain strict time wheel synchronization. Here, the emulation running the RTL and the simulator running SystemC are alternating to process models in either abstraction, and TLM2 transactions are used in the SystemC memory core since a TLM2 access in SystemC can decode read and write transactions. With an alternating process automatic coherency can be implemented, where the shared memory model itself can automatically ensure coherency.

In this configuration, the shared memory block resides as a specific block of memory within the system memory and is allocated a port from a dynamic router, and the system memory supports TLM2 accesses. The shared memory space is divided into pages based on the size of pages used based on the application. Associated with each page is a most recently updated ("MRUP") bit flag, one in the memory domain for each abstraction, corresponding to one of the two abstractions, that is kept consistent across the domains. Thus, there are a pair of bit flags in the memory page of each abstraction: a MRUP bit flag in the SystemC abstraction (sc_is_mrup) and a MRUP bit flag in the RTL abstraction (rtl_is_mrup). When a page is written in one abstraction, its corresponding MRUP bit flag is also set at the same time in the other domain. Using the alternating mode having an appropriate API providing deterministic access, access to RTL and memory objects in the same time-step are ensured. When an address of a memory page is attempted to be read or written in one abstraction when its MRUP flag is set, the memory page is first swapped to be coherent with the other abstraction before the read data is returned.

Figure 3:
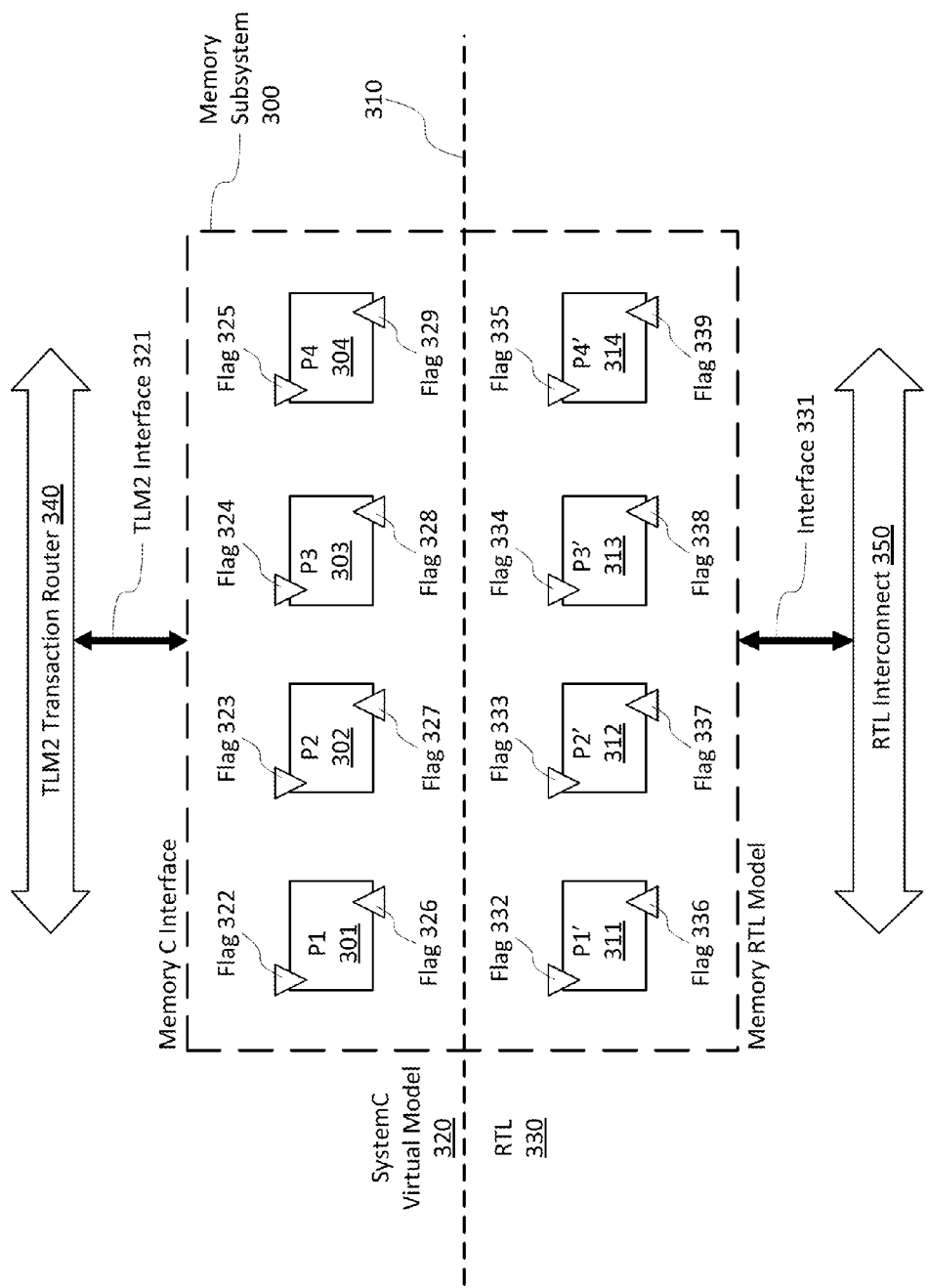
FIG. 3 is a second illustration of a memory subsystem that allows execution in either SystemC simulation or RTL emulation.

FIG. 3 provides an illustration of a modeled memory subsystem according to an embodiment. There are illustrated four memory pages (P) of the memory subsystem 300, where a page is the smallest unit of memory that is synchronized between the SystemC virtual model 320 and RTL model 330, each on either side of the divider 310. Each page P has a representation in both SystemC and a shadow page in RTL page prime (P'). Thus the first page P1 301 on the SystemC side has a shadow page P1' 311 on the RTL side, the second page P2 302 has a shadow page P2' 312, the third page P3 303 has a shadow page P3' 313, and the fourth page P4 304 has a shadow page P4' 314.

Each page and shadow page (P and P' respectively), have an associated pair of flags. The first flag of the pair for each memory page on the SystemC virtual model side 320 is a flag indicating the SystemC memory page is the most recently updated (sc_is_mrup). The first flag of the pair for each memory page of the RTL side 320 is a flag indicating the RTL memory page is the most recently updated (rtl_is_mrup). The second flag of the pair on each side is a copy of these two flags. So, the second flag on the SystemC virtual model side 320 is a copy of the rtl_is_mrup flag, rtl_is_mrup copy, and the second flag on the RTL side is a copy of the sc_is_mrup flag, sc_is_mrup copy. As such, in FIG. 3, the sc_is_mrup flags for pages P1 301 to P4 304 are flags 322 to 325 respectively; the copies of these flags, for the shadow pages P1' 311 to P4' 314 are flags 332 to 335 respectively. The rtl_is_mrup copy flags for pages P1 301 to P4 304 are flags 326 to 329 respectively; the copies of these flags, for the shadow pages P1' 311 to P4' 314 are flags 336 to 339 respectively.

The SystemC virtual model side 320 of the memory subsystem 300 interfaces with a TLM2 transaction router 340 with a transaction-level model interface, such as TLM2 interface 321. According to the other embodiments, other transaction model level interfaces and corresponding routers can be used. The RTL model side 330 interfaces with RTL interconnect 350 with a suitable bus interface of the SOC, for example any of an Advanced High-performance bus (AHB), AXI™, ACE™, or a DDR3 interface.

According to an embodiment, a direct memory interface (DMI) to the SystemC virtual model side of a memory system (the SystemC memory page) is selectively enabled or disabled for shared memory pages modeled in two abstractions. The memory page address space may be segmented in a number of memory pages, and DMI enable or disabled selectively for read access or write access during simulation. For a particular memory page, the DMI interface is enabled so long as the memory page is not marked as shared or accessed by both SystemC and RTL agents. The state of a particular memory page in SystemC and RTL is indicated by the above-described flags sc_is_mrup and rtl_is_mrup. When an access request, which may be a read request or a write request, from a RTL agent is detected, DMI is disabled to allow the access and enable the memory model to invoke coherency procedures. These coherency procedures include synchronization of the SystemC page from RTL in the event the RTL memory page is the most recently updated of the memory page pair, and synchronization of the RTL page from SystemC in the event the SystemC memory page is the most recently for the memory page pair.

On the SystemC side, TLM2 transport type access is decoded to move the state of the memory pages from one state to another state. Once the state change has occurred, certain DMI operations can be enabled for subsequent accesses, summarized in Table 1:

TABLE 1

| State of sc_is_mrup | State of rtl_is_mrup | Description of page state | DMI access from SystemC |
|---|---|---|---|
| 0 | 0 | SystemC page and RTL page are coherent | R+/W− |
| 0 | 1 | SystemC page is out of date with respect to RTL | R−/W− |
| 1 | 0 | SystemC page is more up to date with respect to RTL | R+/W+ |
| 1 | 1 | Invalid | N/A |

In Table 1 (as well as FIG. 4 below), the notation R+ indicates that DMI for read access from SystemC to the shared memory page is enabled. The notation R− indicates that DMI for read access is disabled. The notation W+ indicates that DMI for write access from SystemC to the shared memory page is enabled. The notation W− indicates that DMI for write access is disabled.

When the SystemC memory page and RTL memory page are coherent, DMI read access is enabled and DMI write access is disabled: SystemC can access the memory page for reads using DMI, but a write access must be performed using an explicit transport method in TLM2. When the SystemC page is out of date with respect to RTL, both read and write are disabled: the rtl_is_mrup flag is set and SystemC accesses for both read and write use a TLM2 transport method, allowing page synchronization on access. When the SystemC memory page is more up to date then the RTL memory page, both read and write are enabled: the sc_is_mrup flag is set and SystemC can access the memory page using DMI for both Read/Write. The state where both the sc_is_mrup flag and the rtl_is_mrup flag are set is an invalid state. Depending on the access requests received from an agent of the SystemC model or from the RTL model, the states may change.

Figure 4:
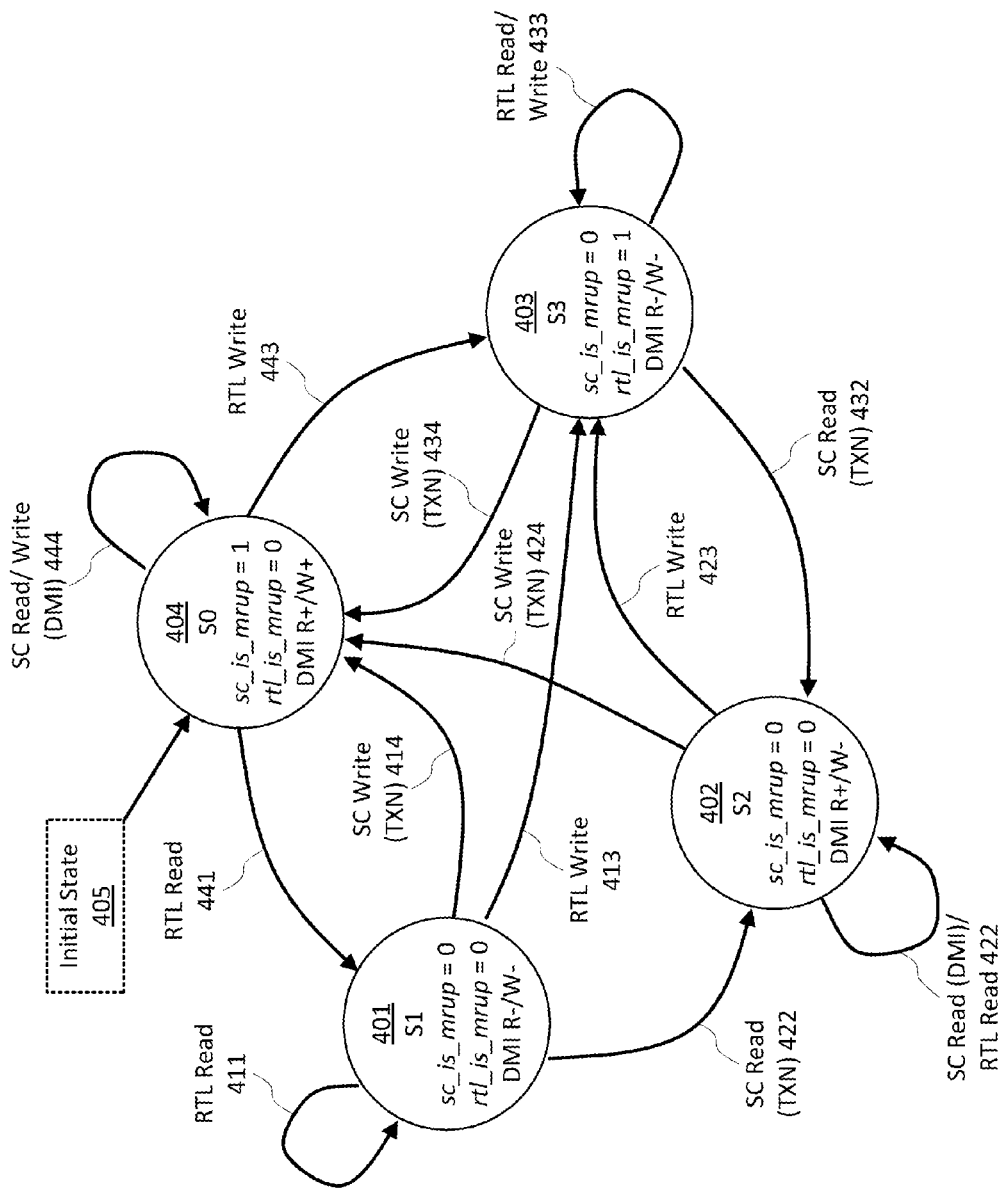
FIG. 4 is an illustration of a state diagram to manage DMI access from SystemC agents to memory pages modeled in dual abstractions.

FIG. 4 is a state diagram to manage DMI according to an embodiment, incorporating the state information of Table 1, according to an embodiment. The state diagram described herein represents the behavior of software, for example running on a host workstation of a functional verification system, to monitor status of the memory pages and control the interface between the SystemC model and the memory subsystem. From an initial state, the memory subsystem is in state S0 404, where the sc_is_mrup flag is set, but the rtl_is_mrup flag is not set. In state S0 404, DMI is enabled for both SystemC read and write. SystemC reads or writes using DMI 444 continue in the same state S0 404 and do not cause a transition. An RTL read 441 or RTL write 443 cause a transition to state S1 401 or S3 403 respectively, disabling DMI. RTL reads 411 can continue, without change from state S1 401. A SystemC write 414, which now occurs with a TLM2 transport access since DMI is disabled, transitions the state back to S0 404, re-enabling DMI. An RTL write 413, while in state S1 401, sets the rtl_is_mrup flag and transitions the memory subsystem to state S3 403 where DMI access from SystemC is disabled.

Back at state S1 401, a SystemC read 422, which occurs with a TLM2 transport access because DMI was disabled, transitions the state of the memory subsystem to state S2 402 where DMI is enabled for read access, but not write access. In state S2 402, both DMI reads and RTL reads can be made without transitioning the state, but write access by either SystemC or RTL will set an MRUP flag and transition the state. A SystemC write 434 made with a TLM2 transport access sets the sc_is_mrup flag and transitions the state to S0 404 where DMI is enabled for both read and write. From state S2 402, a RTL write 423 sets the rtl_is_mrup flag and transitions the memory subsystem state to S3 403 where DMI access from the SystemC side is disabled. Continued RTL reads and/or writes 433 maintain the state S3 403 until a SystemC access to the memory page, either read 432 or write 434, either of which use a TLM2 transport access since DMI is disabled, causes a transition away from SS3 403 to another state. A SystemC read 432 transitions the state back to S2 402, which allows DMI reads and RTL reads. A SystemC write 434 using a TLM2 transport sets the sc_is_mrup flag and transitions the memory subsystem to state S0 404, where DMI is enabled for both read and write.

The described SystemC accesses, both reads 422 and 432 and writes 414, 424, and 434, that transition states are single TLM2 transport accesses. The SystemC accesses that do not transition state, SystemC read and/or write 444 and SystemC read 422 are multiple accesses using DMI; these SystemC accesses will access the memory with DMI while remaining in states S0 or S2 until disrupted by a different type of access. Where most transactions do not change states, SystemC accesses will be able to use DMI for most transactions, even for shared memory pages.

According to this embodiment, moving from R+/W+ (all DMI enabled) to R+/W−, or from R+/W+ to R−/W+, is not possible in a single operation because the SystemC TLM2 standard may not allow selective disablement of DMI for read/write access because the TLM2 standard only permits selective enablement. Thus there is no transition from state S0 404 directly to state S2 402, and an intermediate step can be used to first disable DMI completely (states S1 401 and S3 403), then selectively enabling DMI on next read/write access as needed.

According to an embodiment using SystemC TLM2, DMI is enabled and disabled to implement the above-described states. DMI may be disabled on a particular memory page for both read and write access. For a particular memory page, DMI may be enabled for read access alone, write access alone, or both read and write access.

Disabling DMI can be achieved by use a SystemC TLM2 function supported by DMI capable initiators: invalidate_direct_mem_ptr(page_st_addr, page_end_addr). The invalidate_direct_mem_ptr( ) method lets a target invalidate a DMI pointer previously given to an initiator. The page_st_addr and page_end_addr arguments specify the memory page start address and the memory page end address for the memory page where DMI is to be disabled.

Enabling DMI for read or write or read/write for a particular memory page may be accomplished by two steps. First, from a state where DMI is disabled, in a normal TLM2 transport implementation, a hint is returned to the TLM2 initiator that DMI can be used. This can done by use of following flag in the transaction: tx.set_dmi_allowed(true). Second, when the TLM2 initiator invokes the get_direct_mem_ptr( ) method for the next access, first the range of DMI access is specified specific to a page of memory: dmi_data.set_dmi_ptr (m_mem_array+page_st_addr); dmi_data.set_start_address (page_st_addr); and dmi_data.set_end address(page_end_addr). Then, a method may be invoked for the transaction object using the SystemC TLM2 DMI interface. The method for enabling only a DMI read may be invoked by dmi_data.allow_read( ); return(true). The method for enabling both DMI read and write may be invoked by dmi_data.allow_read_write( ); return(true).

According to another embodiment, the enabling or disabling of memory pages may be performed individually for discrete memory pages of a plurality of differently-sized memory pages, the page start address and page end address specifying the differently-sized memory pages. According to another embodiment, disabling and enabling of DMI may be performed for only a subset of the memory pages that are accessed by both SystemC and RTL agents, while other memory pages are not shared and SystemC may have DMI enabled for SystemC masters to access the memory pages.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A method of maintaining memory coherency in a memory subsystem of a functional verification system using a plurality of design abstractions, wherein the memory subsystem comprises a plurality of memory pages and a plurality of shadow memory pages, wherein each memory page of the plurality of memory pages is modeled in the first design abstraction used by the functional verification system, wherein each shadow memory page is an image of one of the plurality of memory pages and is modeled in the second design abstraction used by the functional verification system, and wherein each memory page of the plurality of memory cages is accessible to an agent in the first design abstraction using a first method and a second method, comprising:

enabling a first method for the agent in the first design abstraction within a host workstation of the functional verification system to access the memory page;

receiving an access request from an agent in the second design abstraction within an emulation hardware device of the functional verification system to access the shadow memory page;

disabling the first method for the agent in the first design abstraction upon receipt of the access request; and enabling a second method for the agent in the first design abstraction to access the memory page upon receipt of the request.

2. The method of accessing memory of claim 1, wherein the access request is a write request, further comprising:

writing to the shadow memory page; and setting a flag associated with the memory page to indicate that the shadow memory page has been updated more recently than the memory page.

3. The method of accessing memory of claim 2, further comprising:

clearing the flag associated with the memory page;

disabling the second method after the flag is cleared; and enabling the first method after the flag is cleared.

4. The method of accessing memory of claim 1, wherein the first design abstraction is a SystemC modeling abstraction.

5. The method of accessing memory of claim 4, wherein the second method is a Direct Memory Interface (DMI) method.

6. The method of accessing memory of claim 5, wherein enabling a second method comprises enabling DMI read and DMI write.

7. The method of accessing memory of claim 1, wherein the second design abstraction is a RTL modeling abstraction.

8. A functional verification system, comprising:

a host workstation that includes:

a workstation memory to store a plurality of memory pages modeled in a first design abstraction, and a processor to run a processor model in the first design abstraction, the processor model configured to run a first agent that can invoke a first method to access a modeled memory page of the plurality of memory pages until the first agent detects that a second agent, configured to run in a second design abstraction in an emulation hardware device, has requested access to a shadow copy of the modeled memory page, whereupon the first method is disabled and the first agent can invoke a second method to access the modeled memory page, wherein each memory page of the plurality of memory pages are accessible to the agent in the first design abstraction using the first method and the second method; and a communication link adapted to connect the emulation hardware device to the host workstation, wherein the communication link can transport a message to indicate that the second agent has requested access to the shadow copy.

9. The functional verification system of claim 8, wherein the host workstation further comprises a first flag register having a state, and associated with the memory page, to indicate whether the memory page is more recently updated than the shadow copy of the memory page.

10. The functional verification system of claim 8, wherein the first design abstraction is a SystemC modeling abstraction.

11. The functional verification system of claim 10, wherein the first method is a Direct Memory Interface (DMI) method.

12. The functional verification system of claim 8, wherein the access request from the second agent comprises a write access request.

13. A computer-readable non-transitory storage medium having stored thereon a plurality of instructions, the plurality of instructions when executed by a computer, cause the computer to perform:

enabling a first method for an agent to access a memory page of a memory subsystem in a functional verification system that uses a plurality of design abstractions, wherein the memory page is one of a plurality of memory pages modeled in a first design abstraction of the plurality of design abstractions within a host workstation of the functional verification system, and wherein each memory pages is accessible to the agent in the first design abstraction using the first method and the second method;

receiving an access request from an agent in a second design abstraction of the plurality of design abstractions to access a shadow memory page that is one of a plurality of shadow memory pages, wherein each shadow memory page is an image of one of the plurality of memory pages and is modeled in the second design abstraction within an emulation hardware device of the functional verification system;

disabling the first method for the agent in the first design abstraction upon receipt of the access request; and enabling a second method for the agent in the first design abstraction to access the memory page upon receipt of the request.

14. The computer-readable non-transitory storage medium of claim 13, wherein the access request is a write request, and wherein the plurality of instructions when executed by a computer, cause the computer to further perform:

writing to the shadow memory page; and setting a flag associated with the memory page to indicate that the memory page has been updated more recently than the shadow memory page.

15. The computer-readable non-transitory storage medium of claim 14, the plurality of instructions when executed by a computer, cause the computer to further perform:

clearing the flag associated with the memory page; disabling the second method after the flag is cleared; and enabling the first method after the flag is cleared.

16. The computer-readable non-transitory storage medium of claim 13, wherein the first design abstraction is a SystemC modeling abstraction.

17. The computer-readable non-transitory storage medium of claim 16, wherein the second method is a Direct Memory Interface (DMI) method.

18. The computer-readable non-transitory storage medium of claim 17, wherein enabling a second method comprises enabling DMI read and DMI write.

19. The computer-readable non-transitory storage medium of claim 13, wherein the second design abstraction is a RTL modeling abstraction.

\* \* \* \* \*